United States Patent
Kataoka et al.

(10) Patent No.: US 11,634,532 B2
(45) Date of Patent: Apr. 25, 2023

(54) 2-PART REACTIVE URETHANE RESIN COMPOSITION AND METHOD FOR PRODUCING THEREOF

(71) Applicants: MAZDA MOTOR CORPORATION, Hiroshima (JP); NIHON TOKUSHU TORYO CO., LTD., Tokyo (JP); COVESTRO DEUTSCHLAND AG, Leverkusen (DE)

(72) Inventors: Shinsuke Kataoka, Hiroshima (JP); Eiichi Kawase, Hiroshima (JP); Masanori Takasaki, Hiroshima (JP); Yuji Watanabe, Tokyo (JP); Hirofumi Takeuchi, Hiroshima (JP); Shinichiro Sado, Amagasaki (JP); Hiroaki Ido, Amagasaki (JP); Shinji Nishikawa, Amagasaki (JP); Saeko Kinami, Amagasaki (JP); Kazuki Murata, Amagasaki (JP)

(73) Assignees: Mazda Motor Corporation, Hiroshima (JP); Nihon Tokushu Toryo Co., Ltd., Tokyo (JP); Covestro Deutschland AG, Leverkusen (DE)

(*) Notice: Subject to any disclaimer, the term of this patent is extended or adjusted under 35 U.S.C. 154(b) by 0 days.

(21) Appl. No.: 17/733,517

(22) Filed: Apr. 29, 2022

(65) Prior Publication Data

US 2022/0251284 A1 Aug. 11, 2022

Related U.S. Application Data

(63) Continuation of application No. 16/368,067, filed on Mar. 28, 2019, now abandoned.

(51) Int. Cl.
| | | |
|---|---|---|
| *C08G 18/76* | (2006.01) | |
| *C08G 18/18* | (2006.01) | |
| *C08J 9/12* | (2006.01) | |
| *C08J 9/14* | (2006.01) | |
| *G10K 11/162* | (2006.01) | |
| *C08G 18/48* | (2006.01) | |
| *B29C 67/24* | (2006.01) | |
| *B29K 75/00* | (2006.01) | |
| *B29K 105/04* | (2006.01) | |

(52) U.S. Cl.
CPC ..... *C08G 18/7664* (2013.01); *C08G 18/1816* (2013.01); *C08G 18/1825* (2013.01); *C08G 18/4837* (2013.01); *C08J 9/122* (2013.01); *C08J 9/125* (2013.01); *C08J 9/127* (2013.01); *C08J 9/142* (2013.01); *G10K 11/162* (2013.01); *B29C 67/246* (2013.01); *B29K 2075/00* (2013.01); *B29K 2105/045* (2013.01); *B29K 2995/0002* (2013.01); *C08G 2110/005* (2021.01); *C08G 2110/0008* (2021.01); *C08G 2110/0058* (2021.01); *C08J 2201/022* (2013.01); *C08J 2203/06* (2013.01); *C08J 2203/10* (2013.01); *C08J 2203/182* (2013.01); *C08J 2205/044* (2013.01); *C08J 2205/06* (2013.01); *C08J 2375/08* (2013.01)

(58) Field of Classification Search
CPC ....... B29C 44/42; B29C 44/60; B29C 67/246; B29K 2075/00; B29K 2105/045; B29K 2995/0002; C08G 18/165; C08G 18/1816; C08G 18/1825; C08G 18/2063; C08G 18/246; C08G 18/324; C08G 18/3271; C08G 18/3275; C08G 18/329; C08G 18/3857; C08G 18/3865; C08G 18/4829; C08G 18/4837; C08G 18/5033; C08G 18/6685; C08G 18/6688; C08G 18/7664; C08G 2110/0008; C08G 2110/005; C08G 2110/0058; C08G 2350/00; C08J 9/0028; C08J 9/08; C08J 9/122; C08J 9/125; C08J 9/127; C08J 9/14; C08J 9/142; C08J 2201/022; C08J 2203/02; C08J 2203/06; C08J 2203/10; C08J 2203/182; C08J 2205/042; C08J 2205/044; C08J 2205/05; C08J 2205/06; C08J 2375/06; C08J 2375/08; G10K 11/162
See application file for complete search history.

(56) References Cited

U.S. PATENT DOCUMENTS

| | | | | |
|---|---|---|---|---|
| 2007/0112086 A1* | 5/2007 | Matsumoto | ........ | C08G 18/632 521/172 |
| 2009/0143495 A1* | 6/2009 | Nozawa | ............ | C08G 18/4288 521/157 |
| 2012/0259029 A1* | 10/2012 | Stegt | .................. | C08G 18/4812 252/183.11 |

FOREIGN PATENT DOCUMENTS

WO WO-2005090431 A1 * 9/2005 ............. C08G 18/10

\* cited by examiner

*Primary Examiner* — John M Cooney
(74) *Attorney, Agent, or Firm* — K&L Gates LLP

(57) ABSTRACT

Provided is a material having an excellent sound-absorbing performance which can be easily applied to the desired area at the operation site and which can effectively prevent sound leakage.
The material includes an open-cell soft polyurethane foam prepared from a 2-part reactive urethane resin composition prepared from a polyisocyanate component and a polyol-containing component,
wherein the polyol-containing component comprises a polyol component, catalysts, a foam stabilizer, an amine compound having primary or secondary amino groups, and carbon dioxide;
wherein an average sound absorption coefficient of said polyurethane foam is 30% or more, measured in accordance with JIS A 1405-2:2007 for 63 hertz to 5000 hertz; and
the length of liquid-dripping is within 300 mm.

21 Claims, 1 Drawing Sheet

2-PART REACTIVE URETHANE RESIN COMPOSITION AND METHOD FOR PRODUCING THEREOF

CROSS REFERENCE TO RELATED APPLICATIONS

This application is a continuation application of U.S. application Ser. No. 16/368,067, now abandoned, which was filed on Mar. 28, 2019, and which claims priority under 35 U.S.C. 119 to Japanese Patent Application No. 2018-067401, which was filed on Mar. 30, 2018, the contents of each are incorporated by reference into this specification.

TECHNICAL FIELD

The present disclosure relates to a 2-part reactive urethane resin composition. More specifically, the present disclosure is related to a 2-part reactive urethane resin composition characterized in that a mixed reaction solution of polyurethane materials proceeds foaming and reaction of urethane formation and urea formation immediately at the location where it is discharged to form a soft polyurethane foam with almost no flowing, and that the formed foam has excellent sound-absorbing property.

BACKGROUND

Nowadays, there is an increasing demand for a comfortable acoustic environment in every place of living spaces. For example, there is a need in general use for reducing intrusion of external sounds, preventing sounds passing between rooms, reducing reverberating sounds by buildings or the like, and taking measures for the sound of rain and there is a growing demand for sound-absorbing materials for such purposes, let alone special quiescent or anechoic rooms in buildings. Additionally, there is a progress for adapting to a comfortable acoustic environment in other purposes such as vehicle bodies, heavy machineries, electrical generators, office automation equipment, or home electronics. Particular examples of vehicle spaces are represented by automobile cabins or railway vehicle cabins and a wide variety of sound-absorbing materials are reported for creating a comfortable acoustic environment.

Most sound-absorbing materials that are currently used are a sheet-form or a fibrous-form product or a panelized material produced in factories or the like and they are often cut out into appropriate shapes and amounts and attached or filled into a space where sound absorbency is intended to be applied. However, there is a trouble of cutting out and attaching and there are cases where sound-absorbing performance cannot be fully demonstrated when filling into spaces since gaps are formed inevitably between the sound-absorbing materials and the peripheral contacting materials. What is capable of solving such problems is an on-site foaming type sound-absorbing material, the type which the material is injected on-site where sound-absorbing performance is intended to be applied and foaming reaction proceeds on the spot (start of reaction, foaming, and completion of reaction). In this case, a seamless construction without gaps is attained by attaching firmly the peripheral materials and the sound-absorbing materials, whereby a more effective sound-absorbing performance can be expected. Particularly, conventionally in automobile industry, there has been a need for improving stiffness of the entire vehicle body and ensuring a comfortable acoustic environment in the living space. In this connection, efforts have been made for embedding injection type resin foaming materials or sound-insulating materials in center pillars having a closed cross section structure or closed cross section parts within the vehicle body framework.

For example, a technique is attempted wherein a thermoset type foam-forming material (such as an epoxy or a rubber) is attached to a closed cross section part and then foamed and cured in a coated incinerator to improve stiffness and sound insulation. However, since such thermoset type foam-forming material is subject to foaming and curing by using the coated incinerator of the automobile, there is a need for suppressing the fluctuation in foaming magnification ratio (unfilled spaces can be created or, excessively foamed parts can be created on the contrary) which is associated with the change of incinerating temperature, depending on the part to be used, and there is also a need to fit the shape of the foam-forming material to the shape of the closed cross section.

In this regard, as a method for foaming and curing under normal temperature mixing, a technique is attempted by using a 2-part reactive urethane resin composition consisted of a main polyol agent and a polyisocyanate curing agent, which is capable of foaming a urethane foam by reaction under a blowing agent (conventionally, exclusively water, or hydrogen atom containing halogenated hydrocarbon systems or low boiling point hydrocarbons used alternatively or in combination) and subject said composition to injection, foaming and curing to provide reinforcement and sound-insulating effect. This injection technique may solve the problem of the above-stated fluctuation in foaming or the like, however, since the injection is performed in a fluidized state, the resin reactant often leaks from the small gaps (or the pore parts) present in the closed cross section. Therefore, there is a need for creating some kind of a seal or a measure by, for example, adjusting the polyurethane composition.

Patent Literature 1 reports a technique wherein a urethane material mixed solution is discharged in froth state to a gap of a body of an automobile to reduce leakage from opening parts and a polyurethane foam is filled in to specific parts only. However, no specific Examples are shown therein and leakage from the opening parts cannot be sufficiently handled just with the technique relying on the froth method and which does not involve reactive adjustment for urethanization. Further, no characteristic value of the polyurethane foam is shown which makes it unclear what kind of sound-absorbing property can be expected.

Patent Literatures 2 and 3 report a technique wherein a polyurethane foam is formed by using a specific amount of specific amines and promoting reactivity of 2-part reactive urethanization to suppress leakage from gaps or pore parts. However, this technique is solely related to a rigid polyurethane foam having a hydroxyl number from 150 to 800 mg KOH/g of the base polyol which is insufficient for sound-absorbing performance. Further, the density of the product (specific gravity of 0.4 in the Example) is not as low as the level obtainable from the current market.

Patent Literature 4 describes a method for forming a rigid polyurethane foam wherein a carbamate of alkanolamine (an adduct of alkanolamine and carbon dioxide) or a mixture of a carbamate of alkanolamine and water as a blowing agent is used, the rigid polyurethane foam having open cavities and connected to automobile parts which are built up on a car body or a car frame. However, since this method is again related to a rigid polyurethane foam, sound-absorbing performance is not enough. Further, the density of the product (from 192 to 384 kg/m3 in the Example) is not as low as the level obtainable from the current market. Generally, it is said that when acoustic waves enter into porous materials such as the urethane foam, the aerial vibration thereof will directly propagate through the air in gaps and bubbled parts inside the material and when they hit against a cell film, the film surface vibrates to convert a part of sound energy into thermal energy thereby generating sound-absorbing action. Accordingly, in order to provide excellent sound-absorbing property, there is a need for softness so that the cell film will vibrate and since the conversion level from air vibration into thermal energy is low in the rigid foams, it is not possible to attain sufficient sound-absorbance.

Under these technical conditions, there is still a need for creating a material having excellent sound-absorbing performance which can be easily injected into a desired area at the operation site and which is capable of preventing sound leakage.

RELATED ART DOCUMENTS

Patent Documents

Patent Document 1 Japanese Unexamined Patent Application Publication No. S61-116509
Patent Document 2 Japanese Unexamined Patent Application Publication No. H10-212332
Patent Document 3 Japanese Unexamined Patent Application Publication No. H11-105057
Patent Document 4 Japanese Unexamined Patent Application Publication No. 2007-528434

SUMMARY

The present disclosure is intended to provide a material having excellent sound-absorbing performance which can be easily applied to a desired area at the operating site and which is capable of effectively preventing sound leakage. The present disclosure is also intended to provide a material which satisfies both excellent sound absorbency and low density and which is highly suitable in operations.

The inventors have now found that when a 2-part reactive urethane resin composition prepared from a combination of specific material components was applied at the operation site, a foam can be easily formed at the desired area and sound leakage can be notably prevented. Further, the inventors have completed the disclosure upon having found that the above-described foam is not only excellent in sound-absorbency but is also low in density, highly suitable in operations and producible efficiently and easily on site. The present disclosure is based upon such findings.

According to the present disclosure, the following are provided.

(1) A 2-part reactive urethane resin composition prepared from a polyisocyanate component (X) and a polyol-containing component (Y),
wherein the polyol-containing component (Y) comprises a polyol component (a), catalysts (b), a foam stabilizer (c), an amine compound having primary or secondary amino groups (d), and carbon dioxide (e);
said 2-part reactive urethane resin composition when cured being an open-cell soft polyurethane foam, wherein the average sound absorption coefficient of said polyurethane foam is 30% or more, measured in accordance with JIS A 1405-2:2007 for 63 hertz to 5000 hertz; and
the length of liquid-dripping is within 300 mm measured in accordance with the following method:
measuring method: an acrylic plate is placed vertically at the position 10 cm away from the discharge position of an injection molding machine, and said a mixture of the polyisocyanate component (X) and the polyol-containing component (Y) is discharged from the injection molding machine to the acrylic plate for 0.2 seconds at a rate of 120 g/sec to form an injected product on the acrylic plate; then, 5 minutes after discharge, the length from the highest point to the lowest point in the vertical direction of the injected product on the acrylic board is measured as the liquid-dripping length.

(2) The 2-part reactive urethane resin composition according to (1), wherein the amine compound comprises aliphatic amines, aromatic amines, or alicyclic amines.

(3) The 2-part reactive resin composition according to (1) or (2), wherein the molecular weight of the amine compound is from 33 to 220.

(4) The 2-part reactive resin composition according to any of (1) to (3), wherein the amine compound has primary or secondary amino groups.

(5) The 2-part reactive urethane resin composition according to any of (1) to (4), wherein the content of the amine compound is from 1 to 15 parts by mass based on 100 parts by mass of the polyol component (a).

(6) The 2-part reactive urethane resin composition according to any of (1) to (5), wherein the content of said carbon dioxide is from 0.5 to 5 parts by mass based on 100 parts by mass of the polyol component (a).

(7) The 2-part reactive urethane resin composition according to any of (1) to (6), wherein the content of amine carbonate formed of the amine compound and carbon dioxide is from 1.5 to 20 parts by mass based on 100 parts by mass of the polyol component (a).

(8) The 2-part reactive urethane resin composition according to any of (1) to (7), wherein the polyisocyanate component (X) is at least one selected from the group consisting of diphenylmethane diisocyanate, polymethylene polyphenyl polyisocyanate, and modifications thereof.

(9) The 2-part reactive urethane resin composition according to any of (1) to (8), wherein cream time of the mixture of the polyisocyanate component (X) and the polyol-containing component (Y) is 1 second or less.

(10) The 2-part reactive urethane resin composition according to any of (1) to (9), wherein the core density of the polyurethane foam is from 10 to 110 kg/m3.

(11) The 2-part reactive urethane resin composition according to any of (1) to (10), wherein the aeration volume of the polyurethane foam is from 3 to 60 L/min, measured in accordance with JIS K 6400-7:2012.

(12) The 2-part reactive urethane resin composition according to any of (1) to (11), wherein the average diameter of the cell size of the polyurethane foam is 400 nm or less.

(13) The 2-part reactive urethane resin composition according to any of (1) to (12), wherein the average diameter of the cell size of the polyurethane foam is 350 nm or less.

(14) The urethane resin composition according to any of (1) to (13), wherein the average sound absorption coefficient of the polyurethane foam is 40% or more, measured in accordance with JIS A 1405-2:2007 for 500 hertz to 2500 hertz.

(15) The 2-part reactive urethane resin composition according to any one of (1) to (14), which is prepared by injecting the mixture of the polyisocyanate component (X) and the polyol-containing component (Y) from the injection molding machine.

According to the present disclosure, a soft polyurethane foam having excellent sound absorbency can be easily formed at the desired area at the operation site by using a 2-part reactive urethane resin composition which has excellent sound absorbency and which the liquid does not drip excessively upon injection. According to the present disclosure, since a soft polyurethane foam having a sound-absorbing property from 500 to 2500 Hz especially required for an acoustic environment for vehicle cabins, can be injected into the desired area by injection molding, it can be utilized advantageously for creating an excellent acoustic environment for vehicle cabins.

According to the present disclosure, a soft polyurethane foam of excellent sound absorbency and low density can be produced effectively and easily at the desired area. Therefore, it can be utilized advantageously for satisfying both the improvement of sound-insulation and weight saving for applicable base substrates, represented by vehicle bodies.

DETAILED DESCRIPTION

2-Part Reactive Urethane Resin Composition

Figure 1:
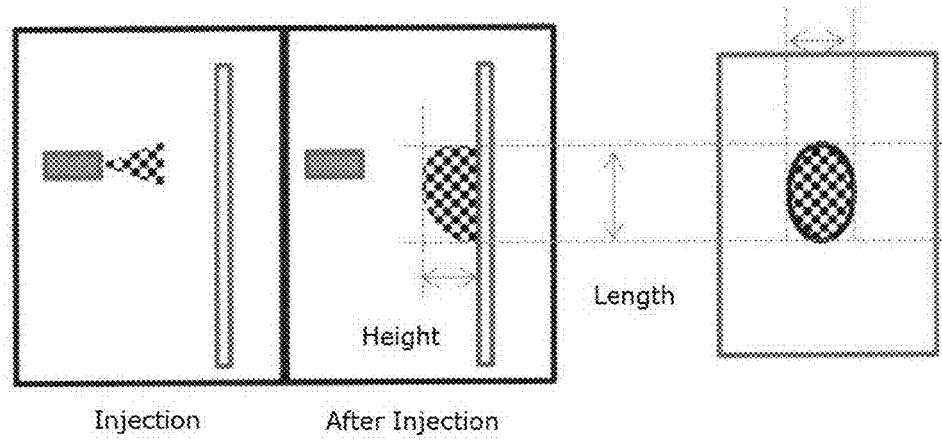
FIG. 1 is a schematic figure illustrating the method for measuring the liquid-dripping of the 2-part reactive urethane resin composition according to the present disclosure.

The 2-part reactive urethane resin composition according to the present disclosure is characterized that it is prepared from a polyisocyanate component (X) and a polyol-containing component (Y), wherein the polyol-containing component (Y) comprises a polyol component (a), catalysts (b), a foam stabilizer (c), an amine compound having primary or secondary amino groups (d), and carbon dioxide (e); said 2-part reactive urethane resin composition when cured being an open-cell soft polyurethane foam, wherein the average sound absorption coefficient of said polyurethane foam is 30% or more, measured in accordance with JIS A 1405-2: 2007 for 63 hertz to 5000 hertz; and the length of liquid-dripping is within 300 mm measured in accordance with the following method:

measuring method: an acrylic plate is placed vertically at the position 10 cm away from the discharge position of an injection molding machine, and a mixture of the polyisocyanate component (X) and the polyol-containing component (Y) is discharged from the injection molding machine to the acrylic plate for 0.2 seconds at a rate of 120 g/s to form an injected product on the acrylic plate; then, 5 minutes after discharge, the length from the highest point to the lowest point in the vertical direction of the injected product on the acrylic board is measured as the liquid-dripping length.

It was unexpected that the 2-part reactive urethane resin composition can be produced which the liquid does not excessively drip upon injection and which forms a polyurethane foam having excellent sound absorbency by the use of the polyisocyanate component (X) and the polyol-containing component (Y) comprising an amine component and carbon dioxide as the constructing material, as like the present disclosure.

Polyisocyanate Component (X)

Polyisocyanate component (X) used for the urethane stock according to the present disclosure is not particularly limited and include, for example, aromatic, cycloaliphatic, and aliphatic polyisocyanates having 2 or more isocyanate groups; a mixture of 2 or more of said polyisocyanates; and modified polyisocyanates obtained by modifying thereof, or the like.

Specific examples of polyisocyanate component (X) include tolylenediisocyanate (TDI), diphenylmethanediisocyanate (MDI), polymethylenepolyphenylpolyisocyanate (so-called: crude MDI), xylenediisocyanate (XDI), isophoronediisocyanate (IPDI), hexamethylenediisocyanate (HMDI), or the like. Specific examples of modified polyisocyanates include prepolymer type modifications of the above-described polyisocyanates, nurate modifications, urea modifications, and carbodiimide modifications, or the like. Amongst them, MDI, crude MDI or modifications thereof are preferred. Using them is preferable in view of improving foam stability and durability and cost, or the like.

The viscosity (mPa·s/25° C.) of the polyisocyanate component of the present disclosure is not particularly limited and preferably is from 50 to 2,000, more preferably from 100 to 1,000, further preferably from 120 to 500.

The specific gravity of the polyisocyanate component (X) is not particularly limited and can be, for example, from 1.1 to 1.25.

Polyol-Containing Component (Y)

Polyol-containing component (Y) according to the present disclosure comprises a polyol component (a), catalysts (b), a foam stabilizer (c), an amine compound having primary or secondary amino groups (d), and carbon dioxide (e).

Polyol Component (a)

Polyol component (a) is preferably a polyether carbonate polyol and more preferably a polyoxyalkylene polyol. According to a particularly preferred embodiment of the present disclosure, the polyol has an average functionality of 2 to 4 and a hydroxyl number from 20 mg to 100 mg KOH/g.

The average functionality of the polyol component (a) is preferably from 2 to 4 and more preferably from 2 to 3 as mentioned above. Here, the average functionality used in the present disclosure refers to the number of functional groups per 1 molecule and means the mean value of the number of active hydrogen in the initiator. The average functionality of the polyol component (a) within the above range will be advantageous for avoiding a defect where the physicality, such as permanent deformation by dry heat compression of the polyurethane foams is significantly reduced. The average functionality of the polyol component (a) within the above range is also preferable for avoiding physicality deterioration of, for example, tensile strength, due to the reduced elongation of the obtained polyurethane foam resulting in higher hardness.

The hydroxyl number of the polyol component (a) is preferably from 20 to 100 mg KOH/g, more preferably from 25 to 90 mg KOH/g, further preferably from 25 to 80 mg KOH/g. 20 mg KOH/g or more of the hydroxyl number of the polyol component (a) is advantageous for suppressing collapse or the like and stably producing the polyurethane foam molded article. 100 mg KOH/g or less of the hydroxyl number of the polyol will not compromise the softness of the polyurethane foam and is preferable for obtaining sound-absorbing performance. In this context, a "hydroxyl number" according to the present disclosure is the number of potassium hydroxide in mg required for acetylating hydroxyl groups contained in 1 g of a sample (solid portion). This can be calculated from the following formula after acetylating the hydroxyl groups in the sample using acetic acid anhydride and titrating the unused acetic acid with a potassium hydroxide solution:

$$\text{a hydroxyl number [mg KOH/g]}=[((A-B) \times f \times 28.05)/S] + \text{acid value}$$

A: an amount of 0.5 mol/l potassium hydroxide ethanol solution used in a blank test (ml)

B: an amount of 0.5 mol/l potassium hydroxide ethanol solution used for titration (ml)

f: a factor

S: a collected amount of a sample (g)

The polyol component (a) can be produced by known means in the art using polymerization units such as initiators, polymerization catalysts, and alkylene oxides. The polymerization catalysts used in the production of the polyols include alkali metal catalysts, cesium catalysts, phosphate-based catalysts, multi metal cyanide complex catalysts (DMC catalysts), or the like.

As for the initiator used for producing the polyol component (a), a compound having 2 or 3 active hydrogens in a molecule is used alone or preferably used in a combination. Specific examples of a compound having 2 active hydrogens include ethylene glycol, propylene glycol, 1,4-butanediol, diethylene glycol, and dipropylene glycol. Specific examples of a compound having 3 active hydrogens include glycerin and trimethylol propane.

Preferably, alkylene oxides are used as a ring-opening addition polymerization unit for polyol component (a), as mentioned above. Alkylene oxides include ethylene oxide, propylene oxide, 1,2-epoxybutane, 2,3-epoxybutane, or the like and propylene oxide or a combination of propylene oxide and ethylene oxide is preferred. When propylene oxide and ethylene oxide are used in combination, each may be separately subjected to ring-opening addition polymerization sequentially to form a block polymeric chain, or, a mixture of propylene oxide and ethylene oxide may be subjected to ring-opening addition polymerization to form a random polymeric chain. Further, formations of the random polymeric chain and block polymeric chain may be combined. When a block polymeric chain is formed, the order of ring-opening addition polymerization is preferably the order from propylene oxide to ethylene oxide, or the order by firstly adding ethylene oxide and then adding in the order propylene oxide and ethylene oxide.

Other types may be a polyester polyol obtainable from reaction of polycarboxylic acid and a low-molecular weight compound containing hydroxyl groups, a polycarbonate polyol obtained from ring-opening polymerization of caprolactone, or a polyether polyamine obtained by aminating hydroxyl groups of a polyether polyol or by hydrolyzing isocyanate prepolymers of a polyether polyol.

One kind of the polyol component (a) may be used or 2 or more kinds may be combined.

The content of the polyol component (a) in the polyol-containing component (Y) is preferably from 50 to 100% by mass, more preferably from 50 to 90% by mass, further preferably from 70 to 90% by mass, based on 100% by mass of the polyol-containing component (Y).

Catalysts (b)

A suitable example of catalysts (b) in the polyol-containing component according to the present disclosure include urethane catalysts. Urethane catalysts are advantageous for reacting polyols with polyisocyanate components. All kinds of catalysts that promote urethanization reaction can be used for the urethane catalysts, for example, tertiary amines such as triethylenediamine, dimethylaminoethanol, bis(2-dimethylaminoethyl)ether, and N,N,N',N'-tetramethylhexamethylenediamine; carboxylic metal salts such as potassium acetate and potassium 2-ethylhexanoate; and organic metallic compounds such as stannous octoate and dibutyl tin dilaurate. The amount of the catalysts may be from 0.1 to 5 parts by mass based on 100 parts by mass of the polyol component.

Foam Stabilizer (c)

The polyol containing composition according to the present disclosure suitably contains a foam stabilizer (c) in view of forming good cells in the polyurethane foam. The cell geometry of the sound-absorbing soft polyurethane foam suitable for the present disclosure can be adjusted by appropriately determining the type, the combination and the amount to be used of the foam stabilizer. Preferably, the average cell size and the aeration volume are appropriately adjusted by using the foam stabilizer in order to provide excellent sound-absorbing property, let alone prevent the foams from collapsing or shrinking after foaming.

One kind of the foam stabilizer (c) may be used or may be a composition by combining 2 or more components. Specific examples of the foam stabilizer (c) include silicone based foam stabilizers or fluorine-containing compound based foam stabilizers and silicone based foam stabilizers are preferable. According to a preferred embodiment of the present disclosure, the silicone based foam stabilizers are silicone foam stabilizers having a polyoxyalkylene-dimethylpolysiloxane copolymer as the main component. Such silicone based foam stabilizers may include the polyoxyalkylene-dimethylpolysiloxane copolymer alone or other components may be combined thereto. Other combined components may be exemplified as a polyoxyalkylmethylsiloxane, glycols or a polyoxyalkylene compound, or the like. According to another preferred embodiment of the present disclosure, the foam stabilizer (c) is also a composition comprising 2 or more kinds selected from a polyoxyalkylene-dimethylpolysiloxane copolymer, a polyalkylmethylsiloxane, and an alkylene oxide compound. Such compounds are especially advantageous in view of foam stability. Examples of commercially available products of the foam stabilizer (c) include trade names of the following: L-580, L-590, L-620, L-680, L-682, L-690, SC-154, SC-155, SC-240, L-598, L-2100, L-2171, SH-210, L-2114, SE-232, L-533, L-534, L-539, M-6682B, L-626, L-627, L-3001, L-3111, L-3415, L-3002, L-3010, L-3222, L-3416, L-3003, L-3333, L-3417, L-2171, L-3620, L-3630, L-3640, L-3170, L-3360, L-3350, L-3555, L-3167, L-3150/L-3151, L-5309, SH-209, and L-3184 manufactured by MOMENTIVE. Examples of other commercially available products include trade names of the following: SF-2964, SF-2962, SF-2969, SF-2971, SF-2902L, SF-2904, SF-2908, SF-2909, SRX-274C, SZ-1328, SZ-1329, SZ-1330, SZ-1336, SZ-1346, SZ-3601, SRX-294A, SRX-280A, SRX-294A, SRX-298, SH-190, SH-192, and SH-194 manufactured by Toray Dow Corning. Examples of other commercially available products include trade names of the following: F-327, F-345, F-305, and F-242T manufactured by Shin-Etsu Chemical Co., Ltd. or trade names of the following: Silbyk 9700, Silbyk 9705, and Silbyk 9710 manufactured by BYK Chemie. Also included are B4113, B4900, B8002, B8110, B8123, B8228, B8232, B8715LF2, B8724LF2, BF2370, and BF2470 manufactured by EVONIC.

The content of the foam stabilizer in the polyol containing composition may be appropriately selected and preferably is from 0.1 to 10 parts by mass based on 100 parts by mass of the polyol component.

Amine Compound Having Primary or Secondary Amino Groups (d)

Amine compound (d) according to the present disclosure may function as a cross-linking agent in the 2-part reactive composition. Therefore, the amine compound (d) is preferably an amine cross-linking agent.

The amine compound (d) according to the present disclosure is preferably aliphatic amines, aromatic amines, or alicyclic amines having primary or secondary amino groups, or the like.

Suitable examples of the aliphatic amine compounds having primary or secondary amino groups include alkylamine compounds such as ethylenediamine, m-xylene diamine, 1,4-diaminohexane, butylamine, hexamethylene diamine, diethylene triamine, triethylene tetramine, and dimethylamino propylamine; alkanolamine compounds such as ethanol amine, N-methylethanol amine, diethanol amine, isopropanol amine, and diisopropanol amine; and hydroxyl amine.

Suitable examples of the aromatic amine compounds having primary or secondary amino groups include 3,5-diethyl-2,4(or 2,6)-diaminotoluene (DETDA), 2-chloro-p-phenylenediamine, 3,5-dimethylthio-2,4 (or 2,6)-diaminotoluene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, and 4,4-diaminodiphenylmethane.

Suitable examples of the alicyclic amine compounds having primary or secondary amino groups include amino groups such as 1,3-bis(aminomethyl)cyclohexane and isophorone diamine; and/or cyclo alkanes having 2 or more amino alkyl groups.

The content of the amine compound (d) is from 1 to 10 parts by mass based on 100 parts by mass of the polyol component (a). From 2 to 9 parts by mass is preferable and from 3 to 8 parts by mass is more preferable. 1 parts by mass or more of the content is preferable for ensuring liquid-dripping of the polyurethane foam. 10 parts by mass or less of the content is preferable in view of considering stabilization when the foam is formed (collapse or shrinkage are generated in the foam when it becomes unstable) and also for cost saving for production of the foams by the use of amine compounds in small amounts.

Carbon Dioxide (e)

Carbon dioxide (e) according to the present disclosure contributes to the foam formation at the earliest stage, immediately after the 2-part is reacted and injected and it may function as a blowing agent in the 2-part reactive composition.

The content of carbon dioxide is from 0.5 to 5 parts by mass based on 100 parts by mass of the polyol component (a). From 1 to 5 parts by mass is preferable and from 2 to 5 parts by mass is more preferable. 0.5 parts by mass or more of the content is preferable in view of ensuring liquid-dripping and low density of the polyurethane foam. 5 parts by mass or less of the content is preferable in view of considering stabilization when the foam is formed (collapse or shrinkage are generated in the foam when it becomes unstable).

Carbon dioxide may be in the form of liquid or gas. When carbon dioxide is in the form of liquid, it can be added to the polyol-containing component (Y) as it is together with other material components such as the polyol component (a) if desired. When carbon dioxide is in the form of gas, it can be added to the polyol-containing component (Y) by introducing into a sealed container such as a tank, together with other material components, and applying pressure. When carbon dioxide is added to the polyol-containing component (Y) within the container such as a tank, this is possible by substituting gas inside the tank by carbon dioxide, then increasing the tank pressure to about 2-5 kgf/cm2 and moderately stirring the polyol-containing component (Y) in the tank.

The amount of dissolved carbon dioxide can be obtained by measuring the density of the polyol-containing component (Y) under atmospheric pressure, in accordance with the following formula.

$$\text{Dissolved carbon dioxide amount (weight \%)} = \frac{\left(\begin{array}{c}\text{density of fresh polyol} \\ \text{containing component } (Y)\end{array}\right) - \left(\begin{array}{c}\text{density of polyol} \\ \text{containing component } (Y) \\ \text{after dissolution}\end{array}\right)}{\left(\begin{array}{c}\text{density of polyol} \\ \text{containing component } (Y) \\ \text{after dissolution}\end{array}\right)} \times \frac{44 \times 100}{22400} \quad \text{Formula 1}$$

As for other blowing agents of carbon dioxide, water, hydrofluorocarbon HFC or the like which is a Freon based blowing agent, or hydrofluoroolefin HFO (1233zd, 1336mzz) or the like may be used.

Water can contribute to the formation of the polyurethane foams by emitting carbon dioxide after reacting with the polyisocyanate component (X). Using water is especially advantageous for reducing the density of the polyurethane foams. Water is used in amounts of preferably from 0 to 10 parts by mass, more preferably from 4 to 6 parts by mass, based on 100 parts by mass of the polyol component (a). Using water in amounts of 0 parts by mass or more is preferable for reducing the density of the polyurethane foam and using in amounts of 10 parts by mass or less is preferable for ensuring stability of the polyurethane foam at the time of molding.

Adduct of Amine Compound Having Primary or Secondary Amino Groups and Carbon Dioxide An amine compound having primary or secondary amino groups (d) and carbon dioxide (e) are known to easily initiate an addition reaction to form an adduct of an amine compound having primary or secondary amino groups and carbon dioxide (also called "amine carbonate salts")(e.g. Japanese Unexamined Patent Application Publication No. S62-220512). For the composition according to the present disclosure, amine carbonate salts can be used as a material in which an amine compound and carbon dioxide are incorporated. The reaction of amine carbonate salts with the polyisocyanate is extremely quick, thus the urea formation reaction can be initiated immediately along with emission of carbon dioxide. Therefore, amine carbonate salts can contribute to the foaming formation (the so-called "froth formation") at the earliest stage immediately after the reaction and discharge of the mixture of the polyisocyanate component (X) and the polyol-containing component (Y).

The synthesis of amine carbonate salts can be prepared by referring to the method described in Japanese. For example, they can be easily synthesized in a relatively short period by heating the amine compound to 30-110° C., preferably 50-80° C., and blowing in carbon dioxide under a condition of 1-5 bar with slow stirring. Normally, at the stage where 1 mol of carbon dioxide is absorbed into 2 amine equivalent of the amine compound, the reaction terminates and heat generation stops. Since this reaction solution sometimes solidifies at normal temperature, in order to avoid this, liquid-form polyols, ethylene glycol or the like may be added to the amine compound in advance.

In the present disclosure, amine carbonate salts may be formed during the production step of the polyol-containing component (Y). According to one embodiment, the polyol-containing component (Y) is obtainable from mixing amine carbonate salts formed of the amine compound and carbon dioxide, and raw components of the polyol-containing component (Y) other than the amine compound and carbon dioxide. Further, according to another embodiment, carbon dioxide and raw components of the polyol-containing component (Y) containing the amine compound are mixed to obtain the polyol-containing component (Y) and amine carbonate salts can be generated in the polyol-containing component (Y).

With respect to the molar ratios of the amine compound and carbon dioxide, in order to obtain function as a sufficient blowing agent, the molar ratio of carbon dioxide is preferably from 0.3 to 0.5 mol, more preferably from 0.4 to 0.5 mol, to 1 mol of the amino groups. Also for the primary or secondary amine compounds having 2 or more amino groups, the molar ratio of carbon dioxide is preferably from 0.3 to 0.5 mol to 1 mol of the amino groups.

In the polyol-containing component (Y) according to the present disclosure, the content of the adduct of the amine compound having primary or secondary amino groups and carbon dioxide is from 3 to 20 parts by mass, preferably from 4 to 18 parts by mass, more preferably from 5 to 15 parts by mass, based on 100 parts by mass of the polyol component (a). 3 parts by mass or more of the content of the above-described adduct is preferable for preventing foamability of the initial polyurethane foam from decreasing and preventing liquid leakage at the time of filling the vehicle body framework. Further, 20 parts by mass or less of the content of the above-described adduct is preferable in view of considering stabilization when the foam is formed (collapse or shrinkage are generated in the foam when it becomes unstable) and also for cost saving for production of the foams by the use of amine compounds in small amounts.

When in the case where amine carbonate salts are used, water or carbon dioxide may be used in combination as a further blowing agent. However, in view of density control, it is preferable to use water and amine carbonate salts only. The use of only water and amine carbonate salts is advantageous for accurately predicting the foaming amount and obtaining foams having stable density and quality.

Other Components

A desired component other than the components mention above may be further blended into the urethane stock when producing the polyurethane foams according to the present disclosure. Additives include fillers such as potassium carbonate or barium sulfate; surfactants such as emulsifiers; antiaging agents such as antioxidants or ultraviolet absorbing agents; flame retardants; plasticizers; colorants; antifungus agents; foam breakers; dispersing agents; discoloration inhibitors or the like.

In view of ensuring safety, a flame retardant may be contained in the polyol-containing component (Y) according to the present disclosure, if desired. The flame retardant is preferably a phosphorous flame retardant and suitable examples are tricresyl phosphate (TCP), triethyl phosphate (TEP), tris(β-chloroethyl)phosphate (TCEP), tris(β-chloropropyl)phosphate (TCPP), or the like. One kind of the flame retardant may be used or multiples thereof may be used in combination. Examples of other flame retardants are metal oxides (for example, iron oxides, titanium oxides, and cerium oxides), metal hydroxides (for example, aluminum hydroxides), bromine-based compounds (for example, brominated diphenyl ether, brominated diphenyl alkane, and brominated phthalimide), phosphorous compounds (for example, red phosphorus, phosphoric ester, phosphoric ester salts, amide phosphate, and organic phosphine oxides), and nitric compounds (for example, ammonium polyphosphate, phosphagene, triazine, and melamine cyanurate). These flame retardants may be used alone or multiples thereof may be used in combination.

If necessary, a so called cross-linking agent of relatively low molecular weight, having polyisocyanate reactive active hydrogens can be blended in.

The cross-linking agent includes a compound having 2 or more hydroxyl groups. Suitable cross-linking agent is a compound having an average functionality from 2.0 to 8.0 and a hydroxyl number from 200 to 2,000 mg KOH/g. One kind of the cross-linking agent may be used or 2 or more kinds may be used in combination. More particular examples of the cross-linking agent will be described below.

The cross-linking agent having hydroxyl groups is a preferably a compound having from 2 to 8 hydroxyl groups and include polyvalent alcohols, low-molecular weight polyoxyalkylene polyols obtainable by adding alkylene oxides to polyvalent alcohols, and polyols having tertiary amino groups (amine compounds having primary or secondary amino groups are excluded).

Particular examples of the cross-linking agent having hydroxyl groups include ethylene glycol, 1,4-butanediol, neopentyl glycol, 1,6-hexanediol, diethylene glycol, triethylene glycol, dipropylene glycol, triethanol amine, glycerin, sorbitol, sucrose, pentaerythritol, N-alkyldiethanol, a bisphenol A-alkylene oxide adduct, a glycerine-alkylene oxide adduct, a trimethylolpropane-alkylene oxide adduct, a pentaerythritol-alkylene oxide adduct, a sorbitol-alkylene oxide adduct, a sucrose-alkylene oxide adduct, an aliphatic amine-alkylene oxide adduct, an alicyclic amine-alkylene oxide adduct, a heterocyclic polyamine-alkylene oxide adduct, an aromatic amine-alkylene oxide adduct, polyols of natural origin, or the like.

Isocyanate Index

The 2-part reactive urethane resin composition according to the present disclosure can be prepared from the polyisocyanate component (X) and the polyol-containing component (Y) as mentioned above. Preferably, the used amount of the polyisocyanate component (X) and the polyol-containing component (Y) is an amount in which the proportion of the polyol-containing component (Y) and the polyisocyanate component (X) in the raw materials is from 80 to 120 in isocyanate index. Isocyanate index can be expressed by [(the ratio of the equivalent amount of the isocyanate groups in the polyisocyanate component to the equivalent amount of active hydrogens in the polyol-containing component)× 100].

Method for Production/Polyurethane Foam Molding Machine

The 2-part reactive urethane resin composition according to the present disclosure can be injected with an injection molding machine and cured to form a soft polyurethane foam. Therefore, the method for producing the urethane resin composition according to the present disclosure comprises a step of injecting a mixture of the polyisocyanate component (X) and the polyol-containing component (Y)

from an injection molding machine. The injection molded machine used for producing the polyurethane foam molded article is not particularly limited and a molded machine of a 2-part mixing type (and a mixing type of 3 or more parts) which is known in the art can be used. Such molding machine includes for example, high-pressure polyurethane molding machines or low-pressure polyurethane molding machines, represented by reactive injection molding machines manufactured by Canon, Hennecke, or Polyurethane Engineering. Mixing method of the 2 parts in such molding machines are not particularly limited and various methods can be used. Exemplified is a method for mechanical stirring by use of stirring blades or the like, a method by static mixers, a method in which 2-part components are opposed and collided under high pressure and the turbulent flow of the liquid in a cavity causes the mixing, or the like. A spraying machine of a 2-part mixing type can also be used. In the present disclosure, the 2-part mixed urethane resin composition is discharged from a molding machine at the site necessary to form the polyurethane foam.

In the production method according to the present disclosure, the temperature of the raw materials of the polyisocyanate component (X) and the polyol-containing component (Y) at the time of injection is not particularly limited, as long as the formation of the polyurethane foams is not interfered, and for example, is from 20 to 60° C., preferably from 30 to 50° C.

The discharged amount of the polyisocyanate component (X) and the polyol-containing component (Y) may be appropriately set respectively, depending on the size of the applicable substrate and reactivity of the raw materials, and for example, is from 1 to 2000 g/sec, preferably from 10 to 1000 g/sec.

According to the production method of the present disclosure, the 2-part reactive urethane resin composition which is obtainable from the polyisocyanate component (X) and the polyol-containing component (Y) in the injection step is cured to form an open-cell soft polyurethane foam. Therefore, according to one embodiment, there is provided a composition for producing the 2-part reactive urethane resin composition together with the polyisocyanate component (X) comprising the polyol-containing component $(Y)_o$. According to another embodiment, there is also provided a composition for producing the 2-part reactive urethane resin composition together with the polyol-containing component (Y) comprising the polyisocyanate component (X). According to the present disclosure, a sound-absorbing polyurethane foam can be formed rapidly at the operation site through the reaction of urethane formation and the urea formation of the 2-part reactive urethane resin composition, along with suppression of liquid-dripping. Thus, there is an advantage that excellent sound absorbency is easily provided at the desired region.

Function/Application

Liquid-Dripping

Method to measure liquid-dripping of the 2-part reactive urethane resin composition according to the present disclosure is as follows.

Measuring method: an acrylic plate is placed vertically at the position 10 cm away from the discharge position of an injection molding machine, and the mixture the polyisocyanate component (X) and the polyol-containing component (Y) is discharged from the injection molding machine to the acrylic plate for 0.2 seconds at a rate of 120 g/sec to form an injected product on the acrylic plate; then, 5 minutes after discharge, the length from the highest point to the lowest point in the vertical direction of the injected product on the acrylic board is measured as the liquid-dripping length. Further details of the measuring method can be performed in accordance with the Examples described below.

The length of liquid-dripping of the 2-part reactive urethane resin composition according to the present disclosure is preferably within 300 mm, more preferably from 50 to 300 mm, further preferably from 70 to 280 mm. Setting such range for the length of liquid-dripping is advantageous for adding the composition at the operation site at a desired position and arranging the polyurethane foams.

Reactivity

Cream time, gel time, and rise time of the 2-part reactive urethane resin composition according to the present disclosure are preferably in short time, in view of suppressing liquid-dripping and forming the polyurethane foam rapidly. In this context, cream time refers to the time period from the time in which mixing of the polyol-containing component and the polyisocyanate component has started, calling this time 0 second, to the time in which change of the color phase starts to happen in said mixed solution and foaming is initiated. Gell time (in seconds) refers to the period in which the mixed solution of the polyol-containing component and the polyisocyanate component is cured (the time until the solution starts to get stringy when touched with a stick-like solid). Rise time (in seconds) refers the time until foaming terminates in the above-stated mixed solution (the time until the rise by foaming of the foam surface stops). In the present disclosure, cream time, gel time, and rise time are according to the mean value of time measurement by visual judgment with stirring by trained, specialized panelists (n=10).

More particularly, cream time of the 2-part reactive urethane resin composition according to the present disclosure is preferably 2 seconds or less, further preferably 1 second or less. Gel time of the above-stated composition is preferably 25 seconds or less, more preferably from 5 to 21 seconds, further preferably from 7 to 10 seconds. Rise time of the above-stated composition is preferably 50 seconds or less, further preferably 40 seconds or less.

Continuous Foaming Soft Polyurethane Foam

The polyurethane foam formed by curing of the 2-part reactive urethane resin composition according to the present disclosure is an open-cell foaming soft polyurethane foam, as mentioned above. In this context, a "continuous foaming soft polyurethane foam" according to the present disclosure means that at least one part of the cells (foams) in the polyurethane foam is continuous, instead of all the cells, and independent air bubbles may be present in the polyurethane foam. In the present disclosure, it is possible to set the aeration volume, softness, and restoration of the polyurethane foams obtainable in the present disclosure in a wide range by controlling the proportion of the continuous foams and the independent foams in the polyurethane foam in an appropriate manner Therefore, according to the preferred embodiment of the present disclosure, continuous air bubbles and individual air bubbles are coexisting in view of ensuring air permeability, softness, and restoration.

Sound-Absorbing Property

When the 2-part reactive urethane resin composition according to the present disclosure cures to form the soft polyurethane foam, the average sound absorption coefficient of such soft polyurethane foam is preferably 40% or more, more preferably from 45 to 99%, measured in accordance with JIS A 1405-2:2007 for 500 hertz (Hz) to 2500 hertz (Hz). Using a polyurethane foam having such average sound absorption coefficient is especially advantageous for selectively absorbing undesired sound and noise entering from outside without interrupting conversations in a vehicle cabin environment.

The peak top in sound absorption coefficient of the above-described soft polyurethane foam measured in accordance with JIS A 1405-2:2007 is preferably in the range between 500 hertz and 2500 hertz, more preferably in between 500 hertz and 2000 hertz. Although in typical soft polyurethane foams, absorption peaks or the main absorption range are mostly found in the area above 2500 Hz, according to the present disclosure, the peak top in sound absorption coefficient of the polyurethane foam set in the above-stated range will allow realizing a good acoustic environment in vehicles or rooms.

Average Cell Size and Aeration Volume

When the 2-part reactive urethane resin composition according to the present disclosure cures to form the soft polyurethane foam, the soft polyurethane foam can be provided with a cell geometry of an open-cell.

In order to obtain sufficient sound-absorbing performance, a cell geometry is preferred in which sound goes through between the cells for the longest distance possible when passing through the polyurethane foam and during such period, sound is reflected diffusely, then distributed and absorbed. The 2-part reactive urethane resin composition according to the present disclosure is especially advantageous for attaining the cell size and the aeration volume suitable for sound absorption as mentioned above in the polyurethane foam. The cell size and the aeration volume can be adjusted by adjusting the respective raw material components such as the foam stabilizer, the polyisocyanate component, the polyol component, amines, catalysts as mentioned above and the condition thereof, or the like, in an appropriate manner.

The average cell size (diameter) in the polyurethane foam according to the present disclosure is preferably from 100 to 400 μm, more preferably from 100 to 350 μm. The average cell size of 100 μm or more is advantageous in preventing the foams to be molded from shrinking. The average cell size of 400 μm or less is advantageous for the sound to pass through the foams in an appropriate distance and exhibiting excellent sound-absorbing property.

The aeration volume in the polyurethane foam according to the present disclosure is preferably from 3 to 60 L/min, more preferably from 4 to 50 L/min. 3 L/min or more of the aeration volume is advantageous in preventing the foams to be molded from shrinking 60 L/min or less of the aeration volume is advantageous in exhibiting excellent sound-absorbing property.

Applicable Substrate

In the present disclosure, the above-stated 2-part reactive urethane resin composition is discharged on to a desired substrate having "open cavities" and by undergoing the reaction comprising foaming and curing, the polyurethane foam can be molded in the substrate. In this context, "an open cavity" means the opened-part to the air which can be used as a filling opening when filling the urethane resin composition into the substrate. The shapes and the arrangement of the substrate are not particularly limited, as long as it has the open cavities (opened parts). In particular, shapes may be of a substantially plain area, a curved area, a hollow space in the part, or other appropriate shapes. Since the urethane resin composition according to the present disclosure has small liquid-dripping, substrates can be used which are even incapable of holding fluid due to those shapes or arrangements.

Sound-Absorbing Material Purposes

The 2-part reactive urethane resin composition according to the present disclosure can be suitably used as a sound-absorbing material in the above-described applicable substrate. Suitable applicable substrates include vehicle bodies and parts thereof, heavy machineries, electrical generators, office automation equipment, home electronics, construction members, or the like, and vehicle bodies (especially of automobiles) or construction members are especially preferred. Vehicle body framework members are preferred as the vehicle body part and include pillars, sills (locking panels), and chassis rails. The urethane resin composition according to the present disclosure can be suitably applied to the vehicle body parts in assembly lines of the vehicle bodies as vehicle body framework filling materials, especially in the production of the vehicle bodies.

EXAMPLES

The disclosure will be explained in details by the aid of the Examples below without being limited by these Examples. Numerical values to be used will represent parts by mass, unless otherwise specified. Units and measuring methods are in accordance with JIS (Japanese Industrial Standards) unless otherwise specified.

Comparative Example 1

A rigid urethane polyurethane foam was produced similar to those described in Example 1 of Japanese Patent Laid-Open Publication No. 2015-4011. The raw materials used are compounds as follows.

Raw Materials of Polyol-Containing Component

Polyol A1: 1.6 mol of formaldehyde and 2.4 mol of diethanol amine, based on 1 mol of nonylphenol, were reacted to obtain a Mannich compound 1. To this Mannich compound 1, propylene oxide (PO) and ethylene oxide (EO) were subjected to ring-opening addition polymerization in this order to obtain a Mannich polyol having a viscosity of 800 mPa·s at 25° C. and a hydroxyl number of 300 mg KOH/g. The ratio of EO to the total amount of PO and EO was 70% by weight at this time.

Polyol B1: Glycerine was used as an initiator and propylene oxide (PO) and ethylene oxide (EO) were subjected to ring-opening addition polymerization in this order to obtain a polyetherpolyol having a viscosity of 800 mPa·s at 25° C. and a hydroxyl number of 35 mg KOH/g. The ratio of EO to the total amount of PO and EO was 15% by weight at this time.

Polyol C1: Pentaerythritol was used as an initiator and only propylene oxide was subjected to ring-opening addition polymerization to obtain a polyetherpolyol having a viscosity of 1800 mPa·s at 25° C. and a hydroxyl number of 370 mg KOH/g.

Catalyst 1: trade name TOYOCAT-RX3, manufactured by TOSOH Corporation (a foaming, reactive catalyst)

Catalyst 2: trade name TOYOCAT-RX7, manufactured by TOSOH Corporation (a foaming, reactive catalyst)

Foam Stabilizer 1: trade name SF-2937, manufactured by Toray Dow Corning

Foam Stabilizer 2: trade name SH-194, manufactured by Toray Dow Corning

Flame Retardant: tris(2-chloropropyl)phosphate (trade name: TMCPP, manufactured by DAIHATI CHEMICAL INDUSTRY CO., Ltd.)

Polyisocyanate: polymeric MDI trade name: Sumidule 44V20L (manufactured by Sumika Bayer Urethane Co., Ltd.) viscosity (25° C.) 180 mPa·s, NCO content: 31.5%
Polyisocyanate
polymethylene polyphenyl polyisocyanate manufactured by Sumika Covestro Urethane Co., Ltd.

Using the above described raw materials, a polyol-containing component was prepared with the formula as shown below, and the polyol-containing component and polyisocyanate were mixed for reaction at liquid temperature of 40° C., room temperature of 20° C., and a volume ratio of 1:1 using a spray foaming machine to produce a rigid foam in accordance with JIS-A-9526.

Polyol A1: 70 parts by mass
Polyol B1: 20 parts by mass
Polyol C1: 10 parts by mass
Water: 17 parts by mass
Catalyst 1: 7 parts by mass
Catalyst 2: 3 parts by mass
Foam Stabilizer 1: 2 parts by mass
Foam Stabilizer 2: 2 parts by mass
Flame Retardant: 40 parts by mass Examples 1 to 11 and Comparative Examples 2 and 3

The polyol mixtures comprising the polyol compounds, catalysts, the foam stabilizers, amine carbonate salts and water as the blowing agents and the polyisocyanate compounds were mixed and reacted with a high-pressure foaming machine to form polyurethane foams. Soft polyurethane foams were produced with the formulae as shown in Table 1.

The raw materials used in the Examples and the Comparative Example 2 and 3 are as follows.
Polyisocyanate
x1: polymethylene polyphenyl polyisocyanate manufactured by Sumika Covestro Urethane Co., Ltd. viscosity (25° C.) 180 mPa·s, NCO content: 31.5%
Polyol
a1: Polyetherpolyol having an average functionality of 3 and a viscosity of 1600 mPa·s at 25° C. and a hydroxyl number of 28 mg KOH/g, obtained by ring-opening addition polymerization of alkyleneoxide.
Catalysts
b1: Dabco33LV (manufactured by EVONIK)
b2: dimethylaminoethanol
b3: Toyoat ET (manufactured by TOSOH Corporation)
b4: dibutyl tin dilaurate
Foam Stabilizer
c1: Tegostab B8724LF2 (manufactured by EVONIK)
Amine Cross-Linking Agent
d1: monoethanolamine
d2: diethanolamine
d3: diethyltoluenediamine
d4: Ethacure 300 (manufactured by Albemarle)
Blowing Agent
e1: water
e2: carbon dioxide
e3: amine carbonate salts consisted of monoethanolamine and carbon dioxide
(molar ratio of the amine compound and carbon dioxide is 1:0.5)
Molding Conditions
Foaming machine: A-system 40Std (manufactured by Cannon)

Temperature of raw materials: polyol-containing component/polyisocyanate component=30-50° C./30-50° C.
Discharged amount per second: 120 g/sec
Discharge pressure: polyol-containing component/polyisocyanate component=13 MPa/13 MPa
Mixing ratio: polyol-containing component/polyisocyanate component=100/42.4-115 (mass ratio)(isocyanate index as 100)
Discharge outlet diameter: 1 cm in diameter (0.785 cm2)

Each evaluation was performed under the following methods. The results are shown in Table 1.

<Reactivity>

The filling time was set to 0.6 seconds under the molding conditions as described in Table 1, 72 g of urethane mixed solution was introduced in to a 1 L cup, and cream time, gel time, rise time were measured. The time when the mixing of the polyol system liquid and the polyisocyanate was commenced was called zero second, and the time until foaming starts was called cream time, the time until the foaming body starts to get stringy when lightly poking the foaming body with a chopstick and pulling out the chopstick from the foaming body was called gel time, the time until the rise of the foam due to foaming stops was called rise time, and each were measured visually (unit: second(s)).

<Shrinkage and Corruption>

In the above-stated reactivity measurement, those which maintained the foam shape after rise time was expressed as "None" and those which shrunk was "Yes". When they collapsed, they were expressed as "Collapsed".

<Core Density>

The filling time was set to 1.2 seconds under the molding conditions as described in Table 1, 144 g of urethane mixed solution was introduced in to an upper face-opened type mold of 200×200×50 mm, and 50 mm×50 mm×30 mm was cut out from the center of the free foamed foam, and density was calculated from the weight.

<Aeration Volume>

The filling time was set to 1.2 seconds under the molding conditions as described in Table 1, 144 g of urethane mixed solution was introduced in to an upper face-opened type mold of 200×200×50 mm, 51 mm×51 mm×25 mm was cut out from the center of the free foamed foam, and the aeration volume was calculated by using a device in accordance with JIS K 6400-7:2012.

<Sound Absorbency>

The filling time was set to 1.2 seconds under the molding conditions as described in Table 1, 144 g of urethane mixed solution was introduced in to an upper face-opened type mold of 200×200×50 mm, D40 mm×30 mm was cut out from the center of the free foamed foam, and sound absorbency was measured by using a vertically-directed sound absorption coefficient measuring system WinZacMTX manufactured by NihonOnkyo Engineering Co., Ltd. in accordance with JIS A 1405-2:2007. The value obtained by dividing the sum of sound absorption coefficient in the prescribed frequency range (63-5000 Hz) by the number of measurement was named average sound absorption coefficient 1. The value obtained by dividing the sum of sound absorption coefficient in the prescribed frequency range (500-2500 Hz) by the number of measurement was named average sound absorption coefficient 2.

<Liquid-Dripping>

Liquid-dripping was measured in accordance with the method as shown in the schematic figure in FIG. 1. In particular, an acrylic plate was placed vertically at the position 10 cm away from the discharge position of an injection molding machine, and the 24 g of the above-described 2-part mixture was discharged from the injection molding machine to the acrylic plate for 0.2 seconds at a rate of 120 g/sec to form an injected product on the acrylic plate. 5 minutes after discharge, the length from the highest point to the lowest point in the vertical direction of the injected product on the acrylic board was measured as the liquid-dripping length. Together, the width and the height of the injected product (the foam) were also measured. Those which dribbled down from the acrylic plate were determined as fallen off. The details of the molding conditions were in accordance with Tables 1 and 2.

<Average Cell Size>

Rectangular solids in 100×50×30 (t) mm were cut out from the center parts of the foams obtained from the Examples or the Comparative Examples. Then, SEM pictures (magnification ratio of 40, name of photographic device: desktop electron scanning microscope NeoScope™ JCM-6000, company name JEOL Ltd.) were taken for the cross-sectional surfaces of the rectangular solids and cell conditions were observed. The cell conditions were evaluated by specialized panelists (10 people). With respect to distribution, 50 cells were selected evenly from the whole area of the observed area and each cell diameter was measured. As for the average diameter, the average value of the cell diameters was shown.

TABLE 1

| | | | | Comparative Example 1 | Comparative Example 2 | Example 1 | Example 2 | Example 3 | Comparative Example 3 | Example 4 | Example 5 |
|---|---|---|---|---|---|---|---|---|---|---|---|
| Polyisocyanate Component X*1 | | x1 | pbw | Described Above | 58 | 98 | 105 | 106 | 105 | 31 | 38 |
| Polyol-containing Component Y | Polyol | a1 | pbw | | 100 | 100 | 100 | 100 | 100 | 100 | 100 |
| | Catalysts | b1 | pbw | | 0.4 | 0.4 | 0.4 | 0.4 | 0.4 | 0.4 | 0.4 |
| | | b2 | pbw | | 0.5 | 0.5 | 0.5 | 0.5 | 0.5 | 0.5 | 0.5 |
| | | b3 | pbw | | 1 | 0.2 | 1 | 0.5 | 0.2 | 0.2 | 0.2 |
| | | b4 | pbw | | 0.05 | — | 0.05 | 0.05 | 0.05 | — | — |
| | Foam Stabilizer | c1 | pbw | | 1 | 1 | 1 | 1 | 0.1 | 1 | 1 |
| | Blowing Agents | e1 | pbw | | 6 | 6 | 6 | 6 | 6 | 0 | 0 |
| | | e2 | pbw | | 2 | 1 | 2 | 2 | 2 | 2 | 3 |
| | Amine Compounds | d1 | pbw | | 0 | 3 | 6 | 6 | 6 | 5 | 8 |
| | | d2 | pbw | | — | — | — | — | — | — | — |
| | | d3 | pbw | | — | — | — | — | — | — | — |
| | | d4 | pbw | | — | — | — | — | — | — | — |
| Notes | | | | | *3 | *2 | *2 | *2 | *2 | *2 | *2 |
| Molding Conditions | Raw Material Temperature | Polyisocyanate Component X | °C. | 30 | 30 | 30 | 30 | 50 | 30 | 30 | 30 |
| | | Polyol-containing Component Y | °C. | 30 | 30 | 30 | 30 | 50 | 30 | 30 | 30 |
| Reactivity | | Cream Time | sec | — | — | 1> | 1> | 1> | 1> | 1> | 1> |
| | | Gel Time | sec | — | 7 | 21 | 5 | 2.5 | 5 | 9 | 8 |
| | | Rise Time | sec | — | 14 | 31 | 12 | 12 | 12 | 14 | 13 |
| Foam Property | | Shrinkage (Yes/None) or Collapse | None | None | None | None | None | None | None | None | None |
| | | Liquid-dripping | | — | — | Fell off | ○ | ○ | ○ | ○ | ○ | ○ |
| | | Liquid-dripping (Length) | mm | — | — | 337 | 150 | 149 | 205 | 175 | 150 |
| | | Core Density | kg/m³ | 20 | 26 | 37 | 25 | 25 | 25 | 104 | 89 |
| | | Aeration Volume | L/min | 10 | — | 4 | 20 | 24 | 380 | 18 | 34 |
| | | Average Cell Size | nm | 250 | — | 350 | 230 | 270 | 1220 | 130 | 150 |
| | | Average sound absorption coefficient 1 (63-5000 Hz) | % | 15 | — | 44 | 40 | 31 | 20 | 35 | 45 |
| | | Average sound absorption coefficient 2 (500-2500 Hz) | % | 18 | — | 65 | 42 | 41 | 17 | 50 | 50 |
| | | Peak Top Position of Sound-absorbence | Hz | 3150 | — | 1000 | 1250 | 1250 | 4000 | 1000 | 1250 |

| | | | | Example 6 | Comparative Example 4 | Example 7 | Example 8 | Example 9 | Example 10 | Example 11 |
|---|---|---|---|---|---|---|---|---|---|---|
| Polyisocyanate Component X*1 | | x1 | pbw | 35 | 53 | 82 | 94 | 103 | 91 | 90 |

TABLE 1-continued

| | | | | | | | | | | |
|---|---|---|---|---|---|---|---|---|---|---|
| Polyol-containing Component Y | Polyol | a1 | pbw | 100 | 100 | 100 | 100 | 100 | 100 | 100 |
| | Catalysts | b1 | pbw | 0.4 | 0.4 | 0.4 | 0.4 | 0.4 | 0.4 | 0.4 |
| | | b2 | pbw | 0.5 | 0.5 | 0.5 | 0.5 | 0.5 | 0.5 | 0.5 |
| | | b3 | pbw | 0.2 | 0.2 | 0.2 | 0.2 | 1 | 1 | 1 |
| | | b4 | pbw | — | — | — | — | 0.05 | 0.05 | 0.05 |
| | Foam Stabilizer | c1 | pbw | 1 | 1 | 1 | 1 | 1 | 1 | 1 |
| | Blowing Agents | e1 | pbw | 0 | 0 | 4 | 5 | 6 | 6 | 6 |
| | | e2 | pbw | 4.7 | 5.1 | 2 | 2 | 2 | 2 | 2 |
| | Amine Compounds | d1 | pbw | 14 | 16 | 6 | 6 | — | — | — |
| | | d2 | pbw | — | — | — | — | 6 | — | — |
| | | d3 | pbw | — | — | — | — | — | 6 | — |
| | | d4 | pbw | — | — | — | — | — | — | 6 |
| | Notes | | | *2 | *2 | *2 | *2 | *3 | *3 | *3 |
| Molding Conditions | Raw Material Temperature | Polyisocyanate Component X | °C. | 30 | 30 | 30 | 30 | 30 | 30 | 30 |
| | | Polyol-containing Component Y | °C. | 30 | 30 | 30 | 30 | 30 | 30 | 30 |
| Reactivity | | Cream Time | sec | 1> | 1> | 1> | 1> | 1> | 1> | 1> |
| | | Gel Time | sec | 7 | 5 | 7 | 8 | 5 | 6 | 6 |
| | | Rise Time | sec | 12 | 10 | 17 | 13 | 12 | 14 | 14 |
| Foam Property | | Shrinkage (Yes/None) or Collapse | | None | None | Collapsed | None | None | None | None |
| | | Liquid-dripping | | — | ○ | — | ○ | ○ | ○ | ○ |
| | | Liquid-dripping (Length) | mm | 135 | — | 230 | 225 | 170 | 152 | 185 |
| | | Core Density | kg/ma | 86 | — | 36 | 31 | 25 | 24 | 25 |
| | | Aeration Volume | L/min | 55 | — | 26 | 30 | 22 | 17 | 15 |
| | | Average Cell Size | nm | 150 | — | 280 | 310 | 250 | 310 | 290 |
| | | Average sound absorption coefficient 1 (63-5000 Hz) | % | 43 | — | 38 | 39 | 35 | 45 | 33 |
| | | Average sound absorption coefficient 2 (500-2500 Hz) | % | 60 | — | 51 | 52 | 41 | 45 | 40 |
| | | Peak Top Position of Sound-absorbence | Hz | 1250 | — | 800 | 1000 | — | — | — |

*1Parts by mass of polyisocyanate based on 100 parts by mass polyol-containing component (isocyanate index 100).
*2 Amine Carbonate Salts, used as e3
*3 Carbon Dioxide dissolved in polyol-containing component Y in tank container.

Figure 2:
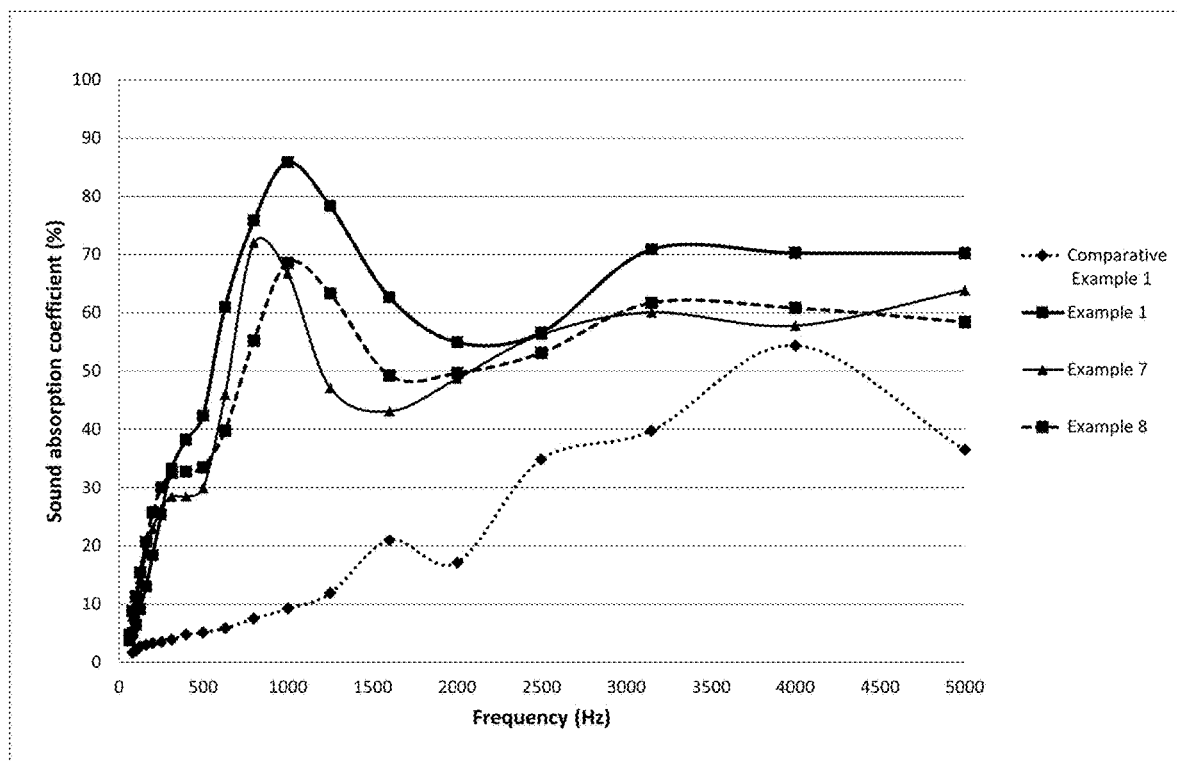
FIG. 2 is a graph showing the results by measuring the sound absorption coefficient in the Examples according to the present disclosure.

It can be understood from Comparative Example 1 in Table 1 that the rigid polyurethane foam of all water blown foam which is a heat insulating material for houses showed no liquid-dripping or shrinkage due to its rapid reactivity and continuous foaming, however, due to its rigidness, it had lower sound-absorbing performance than the soft polyurethane foam (Example 1) in all the frequency areas. This was also shown in sound absorption coefficient of FIG. 2. Further, in FIG. 2, the peak tops (1250 Hz) of Example 1, Example 7 and Example 8 was shifted to the shorter frequency range compared with that of Comparative Example 1. Though not shown in FIG. 2, the other Examples also showed the same tendency as Example 1 in terms of sound absorption coefficient as well as peak top.

In Comparative Example 2 shown in Table 2, the amine compound was not used and liquid dripped even by adjusting reactivity to become rapid and rise time to 14 seconds, resulting in falling of the foam. In Comparative Example 3, the cells closed in the soft polyurethane foam due to the addition of the amine compound in large amounts of 16 parts by mass and a problem arose in which the polyurethane foam shrunk On the other hand, in Examples 1 and 2, evaluation was performed with 6 parts by mass of water as the blowing agent and 3 and 6 parts by mass of the amine compound (4 and 8 parts by mass as amine carbonate salts). Both reactivity and foam property were good.

In Example 3, although the formulation was the same as Example 2, molding was performed by increasing the liquid temperature of the polyol-containing component and the polyisocyanate component to 50° C. However, a foam was able to be formed without being in a shrunk or a collapsed state which allowed to confirm the stable formability of this system.

In Comparative Example 3, the larger the aeration volume or the average cell size became, the more the average sound absorption coefficient decreased. This demonstrated that it is important to adjust the aeration volume or the average cell size in order to obtain excellent sound-absorbing property.

In Examples 4, 5, and 6, no water as the blowing agent was used but only amine carbonate salts and foaming was performed by changing the amount thereof to 8-18.7 parts by mass. These were good in both reactivity and foam property.

However, when the amount of amine carbonate salts was 21 parts by mass, shrinkage occurred in the foam as shown in Comparative Example 4.

In Examples 7 and 8, water as the blowing agent was used in 4 and 5 parts by mass respectively and both reactivity and foam property were good.

In Examples 9, 10, and 11, it was confirmed that a similar effect was obtainable as the Examples by compounding the amine compound and carbon dioxide individually into the polyol-containing component, even without using amine carbonate salts in which the amine compound and carbon dioxide are integrated.

INDUSTRIAL APPLICABILITY

According to the present disclosure, a soft polyurethane foam having excellent sound-absorbing performance can be applied for on-site foaming. Additionally, it is suitable for wide applications for on-site foaming of constructions, construction materials, vehicle bodies or the like since the reaction mixture solution completes foaming immediately at the place being discharged without flowing and also has low density and high productivity.

Clause 1: A 2-part reactive urethane resin composition prepared from a polyisocyanate component (X) and a polyol-containing component (Y),
wherein the polyol-containing component (Y) comprises a polyol component (a), catalysts (b), a foam stabilizer (c), an amine compound having primary or secondary amino groups (d), and carbon dioxide (e);
said 2-part reactive urethane resin composition when cured being an open-cell soft polyurethane foam, wherein an average sound absorption coefficient of said polyurethane foam is 30% or more, measured in accordance with JIS A 1405-2:2007 for 63 hertz to 5000 hertz; and
the length of liquid-dripping is within 300 mm measured in accordance with the following method:
measuring method: an acrylic plate is placed vertically at the position 10 cm away from the discharge position of an injection molding machine, and a mixture of the polyisocyanate component (X) and the polyol-containing component (Y) is discharged from the injection molding machine to the acrylic plate for 0.2 seconds at a rate of 120 g/sec to form an injected product on the acrylic plate; then, 5 minutes after discharge, the length from the highest point to the lowest point in the vertical direction of the injected product on the acrylic board is measured as the liquid-dripping length.

Clause 2: The 2-part reactive urethane resin composition according to clause 1, wherein the amine compound comprises aliphatic amines, aromatic amines, or alicyclic amines Clause 3: The 2-part reactive resin composition according to clause 1 or 2, wherein the molecular weight of the amine compound is from 33 to 220.

Clause 4: The 2-part reactive resin composition according to any one of clauses 1 to 3, wherein the amine compound has primary or secondary amino groups.

Clause 5: The 2-part reactive urethane resin composition according to any one of clauses 1 to 4, wherein the content of the amine compound is from 1 to 15 parts by mass based on 100 parts by mass of the polyol component (a).

Clause 6: The 2-part reactive urethane resin composition according to any one of clauses 1 to 5, wherein the content of said carbon dioxide is from 0.5 to 5 parts by mass based on 100 parts by mass of the polyol component (a).

Clause 7: The 2-part reactive urethane resin composition according to any one of clauses 1 to 6, wherein the content of amine carbonate formed of the amine compound and carbon dioxide is from 1.5 to 20 parts by mass based on 100 parts by mass of the polyol component (a).

Clause 8: The 2-part reactive urethane resin composition according to any one of clauses 1 to 7, wherein the polyisocyanate component (X) is at least one selected from the group consisting of diphenylmethane diisocyanate, polymethylene polyphenyl polyisocyanate, and modifications thereof.

Clause 9: The 2-part reactive urethane resin composition according to any one of clauses 1 to 8, wherein cream time of the mixture of the polyisocyanate component (X) and the polyol-containing component (Y) is 1 second or less.

Clause 10: The 2-part reactive urethane resin composition according to any one of clauses 1 to 9, wherein the core density of the polyurethane foam is from 10 to 110 kg/m3.

Clause 11: The 2-part reactive urethane resin composition according to any one of clauses 1 to 10, wherein the aeration volume of the polyurethane foam is from 3 to 60 L/min, measured in accordance with JIS K 6400-7:2012.

Clause 12: The 2-part reactive urethane resin composition according to any one of clauses 1 to 11, wherein the average diameter of the cell size of the polyurethane foam is 400 nm or less.

Clause 13: The 2-part reactive urethane resin composition according to any one of clauses 1 to 12, wherein the average diameter of the cell size of the polyurethane foam is 350 nm or less.

Clause 14: The 2-part reactive urethane resin composition according to any one of clauses 1 to 13, wherein the average sound absorption coefficient of the polyurethane foam is 40% or more, measured in accordance with JIS A 1405-2:2007 for 500 hertz to 2500 hertz.

Clause 15: The 2-part reactive urethane resin composition according to any one of clauses 1 to 14, which is prepared by injecting the mixture of the polyisocyanate component (X) and the polyol-containing component (Y) from the injection molding machine.

The invention claimed is:
1. An open-cell soft polyurethane foam prepared from a 2-part reactive urethane resin composition prepared from a polyisocyanate component (X) and a polyol-containing component (Y),
wherein the polyol-containing component (Y) comprises a polyol component (a), catalysts (b), a foam stabilizer (c), an amine compound having primary or secondary amino groups (d), and carbon dioxide (e);
wherein an average sound absorption coefficient of said open-cell soft polyurethane foam is 30% or more, measured in accordance with JIS A 1405-2:2007 for 63 hertz to 5000 hertz; and wherein
a length of liquid-dripping is within 300 mm measured in accordance with the following measuring method:
an acrylic plate is placed vertically at a position 10 cm away from the discharge position of an injection molding machine, and a mixture of the polyisocyanate component (X) and the polyol-containing component (Y) is discharged from the injection molding machine to the acrylic plate for 0.2 seconds at a rate of 120 g/sec to form an injected product on the acrylic plate; then, 5 minutes after discharge, the length from the highest point to the lowest point in the vertical direction of the injected product on the acrylic board is measured as the liquid-dripping length.

2. The open-cell soft polyurethane foam according to claim 1, wherein the amine compound comprises aliphatic amines, aromatic amines, or alicyclic amines.

3. The open-cell soft polyurethane foam according to claim 1, wherein the molecular weight of the amine compound is from 33 to 220.

4. The open-cell soft polyurethane foam according to claim 1, wherein the amine compound has primary or secondary amino groups.

5. The open-cell soft polyurethane foam according to claim 1, to wherein the content of the amine compound is from 1 to 15 parts by mass based on 100 parts by mass of the polyol component (a).

6. The open-cell soft polyurethane foam according to claim 1, wherein the content of said carbon dioxide is from 0.5 to 5 parts by mass based on 100 parts by mass of the polyol component (a).

7. The open-cell soft polyurethane foam according to claim 1, wherein the content of amine carbonate formed of the amine compound and carbon dioxide is from 1.5 to 20 parts by mass based on 100 parts by mass of the polyol component (a).

8. The open-cell soft polyurethane foam according to claim 1, wherein the polyisocyanate component (X) is at least one selected from the group consisting of diphenylmethane diisocyanate, polymethylene polyphenyl polyisocyanate, and modifications thereof.

9. The open-cell soft polyurethane foam according to claim 1, wherein cream time of the mixture of the polyisocyanate component (X) and the polyol-containing component (Y) is 1 second or less.

10. The open-cell soft polyurethane foam according to claim 1, wherein the core density of the open-cell soft polyurethane foam is from 10 to 110 kg/m$^3$.

11. The open-cell soft polyurethane foam according to claim 1, wherein an aeration volume of the open-cell soft polyurethane foam is from 3 to 60 L/min, measured in accordance with JIS K 6400-7:2012.

12. The open-cell soft polyurethane foam according to claim 1, wherein an average diameter of the cell size of the open-cell soft polyurethane foam is 400 nm or less.

13. The open-cell soft polyurethane foam according to claim 1, wherein an average diameter of the cell size of the open-cell soft polyurethane foam is 350 nm or less.

14. The open-cell soft polyurethane foam according to claim 1, wherein an average sound absorption coefficient of the open-cell soft polyurethane foam is 40% or more, measured in accordance with JIS A 1405-2:2007 for 500 hertz to 2500 hertz.

15. The open-cell soft polyurethane foam according to claim 1, wherein the 2-part reactive urethane composition is prepared by injecting the mixture of the polyisocyanate component (X) and the polyol-containing component (Y) from the injection molding machine.

16. The open-cell soft polyurethane foam according to claim 1, wherein the polyol component (a) has an average functionality of 2 to 4 and a hydroxyl number from 20 mg KOH/g to 100 mg KOH/g.

17. The open-cell soft polyurethane foam according to claim 16, wherein the polyol component (a) has an average functionality of 2 to 3.

18. The open-cell soft polyurethane foam according to claim 17, wherein the polyol component (a) has a hydroxyl number from 25 mg KOH/g to 90 mg KOH/g.

19. The open-cell soft polyurethane foam according to claim 17, wherein the polyol component (a) has a hydroxyl number from 25 mg KOH/g to 80 mg KOH/g.

20. A method for production of the open-cell soft polyurethane foam according to claim 1, the method comprising
preparing a 2-part reactive urethane resin composition by mixing a polyisocyanate component (X) and a polyol-containing component (Y),
wherein the polyol-containing component (Y) comprises a polyol component (a), catalysts (b), a foam stabilizer (c), an amine compound having primary or secondary amino groups (d), and carbon dioxide (e),
discharging the 2-part reactive urethane resin composition onto a substrate having an open cavity, and
letting the 2-part reactive urethane resin composition foam and cure to form the open-cell soft polyurethane foam.

21. The method according to claim 20, wherein a cream time of the 2-part reactive urethane resin composition is less than 1 second, and the cream time is a time from the start of the change of hue in the mixed liquid to the start of foaming, wherein a time for starting the mixing of the polyol-containing component (Y) and the polyisocyanate component (X) is set to zero seconds.

* * * * *